United States Patent
Aharoni et al.

(10) Patent No.: US 8,423,588 B2
(45) Date of Patent: Apr. 16, 2013

(54) COMPOSITE NESTED STREAMS

(75) Inventors: Avner Y. Aharoni, Seattle, WA (US); Henricus Johannes Maria Meijer, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/411,345

(22) Filed: Mar. 2, 2012

(65) Prior Publication Data

US 2012/0173592 A1 Jul. 5, 2012

Related U.S. Application Data

(63) Continuation of application No. 11/782,627, filed on Jul. 24, 2007, now Pat. No. 8,156,149.

(51) Int. Cl.
*G06F 17/30* (2006.01)
(52) U.S. Cl.
USPC ............ 707/811; 707/829; 715/234; 715/237
(58) Field of Classification Search .................. 707/791, 707/792, 797, 802, 811, E17.125, E17.045, 707/829; 715/234, 236, 237
See application file for complete search history.

(56) References Cited

U.S. PATENT DOCUMENTS

| | | | | |
|---|---|---|---|---|
| 5,251,313 A * | 10/1993 | Spenik et al. | .................... | 710/29 |
| 6,226,675 B1 * | 5/2001 | Meltzer et al. | ................. | 715/234 |
| 6,799,184 B2 * | 9/2004 | Bhatt et al. | ............. | 707/999.003 |
| 7,010,538 B1 | 3/2006 | Black | | |
| 7,152,205 B2 | 12/2006 | Day et al. | | |
| 7,158,990 B1 * | 1/2007 | Guo et al. | ..................... | 709/203 |
| 7,480,660 B1 | 1/2009 | Black | | |
| 7,567,968 B2 | 7/2009 | Desai et al. | | |
| 7,647,298 B2 | 1/2010 | Adya et al. | | |
| 7,680,787 B2 | 3/2010 | Di Giulio | | |
| 7,711,739 B2 | 5/2010 | Schach et al. | | |
| 7,970,730 B2 | 6/2011 | Meijer et al. | | |
| 8,010,279 B2 | 8/2011 | Kobuya et al. | | |
| 8,156,149 B2 * | 4/2012 | Aharoni et al. | ............... | 707/791 |
| 2002/0194227 A1 | 12/2002 | Day et al. | | |
| 2003/0101169 A1 * | 5/2003 | Bhatt et al. | ........................ | 707/3 |

(Continued)

OTHER PUBLICATIONS

Chiueh et al.—"Zodiac: A History-based interactive video authoring system"—Multimedia Systems, vol. 8, No. 1, 2000 (pp. 201-211).*

(Continued)

*Primary Examiner* — Anh Ly
(74) *Attorney, Agent, or Firm* — Zete Law, P.L.L.C.; MacLane C. Key

(57) ABSTRACT

Reshaping of streams is provided to facilitate utilizing the streams without rapidly increasing memory requirements as the size of the stream increases. The streams can be pushed to alternative storage upon being reshaped, for example, such as to a persistent storage. If the streams lose structure, for example if a hierarchical stream is reshaped into a flat structure for storage in a database, structural information can be stored along with the streams and utilized to shape the stream to its original structure upon request for data, for example. Streams can be pulled from an exposing device or application, and portions of the stream can be transformed and stored according to a set of stop elements; the stop elements can be associated with functions that take action on the stream upon reaching a stop element, such as transforming and storing a portion thereof.

15 Claims, 10 Drawing Sheets

U.S. PATENT DOCUMENTS

| | | | |
|---|---|---|---|
| 2003/0196170 A1* | 10/2003 | Bowers | 715/513 |
| 2003/0233397 A1 | 12/2003 | Katz et al. | |
| 2003/0237047 A1* | 12/2003 | Borson | 707/203 |
| 2004/0064466 A1 | 4/2004 | Manikutty et al. | |
| 2004/0088415 A1* | 5/2004 | Chandrasekar et al. | 709/226 |
| 2004/0199524 A1 | 10/2004 | Rys et al. | |
| 2005/0004896 A1 | 1/2005 | Cseri et al. | |
| 2005/0010896 A1 | 1/2005 | Meliksetian et al. | |
| 2005/0091126 A1* | 4/2005 | Junger | 705/26 |
| 2005/0091251 A1* | 4/2005 | Ramarao | 707/101 |
| 2005/0091285 A1 | 4/2005 | Krishnan et al. | |
| 2005/0165724 A1 | 7/2005 | West | |
| 2005/0183071 A1 | 8/2005 | Meijer et al. | |
| 2006/0100989 A1* | 5/2006 | Chinchwadkar et al. | 707/3 |
| 2006/0167867 A1 | 7/2006 | Schach et al. | |
| 2006/0167880 A1 | 7/2006 | Meljer et al. | |
| 2006/0168515 A1* | 7/2006 | Dorsett et al. | 715/513 |
| 2006/0173804 A1 | 8/2006 | Desai et al. | |
| 2006/0236224 A1 | 10/2006 | Kuznetsov et al. | |
| 2006/0277459 A1* | 12/2006 | Lemoine | 715/513 |
| 2007/0022103 A1 | 1/2007 | Rys et al. | |
| 2007/0043686 A1* | 2/2007 | Teng et al. | 707/1 |
| 2007/0094286 A1* | 4/2007 | Murthy et al. | 707/101 |
| 2007/0130508 A1* | 6/2007 | Gibbins | 715/513 |
| 2007/0226196 A1 | 9/2007 | Adya et al. | |
| 2007/0226203 A1 | 9/2007 | Adya et al. | |
| 2007/0260627 A1 | 11/2007 | Knittel et al. | |
| 2008/0256045 A1* | 10/2008 | Teng et al. | 707/3 |
| 2009/0030926 A1* | 1/2009 | Aharoni et al. | 707/102 |
| 2009/0094195 A1 | 4/2009 | Black | |
| 2012/0173592 A1* | 7/2012 | Aharoni et al. | 707/811 |

OTHER PUBLICATIONS

Rozsnyai et al.—"Concepts and Models for Typing Events for Event-Based Systems"—DEBS'07 Proceedings of the 2007 inaugural international conference on Distributed Event-Based Systems, Jun. 20-22, 2007 (pp. 62-70).*

International Search Report and Written Opinion dated Jan. 16, 2009 for PCT Patent Application No. PCT/US2008/070361; 10 pages.

Chlueh et al.—"Zodiac: A History-based interactive video authoring system"—Multimedia Systems, vol. 8, No. 1, 2000 (pp. 201-211).

* cited by examiner

COMPOSITE NESTED STREAMS

RELATED APPLICATIONS

This application is a continuation of, and claims priority to, U.S. patent application Ser. No. 11/782,627, now U.S. Pat. No. 8,156,149, filed Jul. 24, 2007, and entitled "COMPOSITE NESTED STREAMS." The disclosure of the above-identified application is hereby incorporated by reference in its entirety as if set forth herein in full.

BACKGROUND

The evolution of computers and networking technologies from high-cost, low performance data processing systems to low cost, high-performance communication, problem solving, and entertainment systems has provided a cost-effective and time saving means to lessen the burden of performing every day tasks such as correspondence, bill paying, shopping, budgeting information and gathering, etc. For example, a computing system interfaced to the Internet, by way of wire or wireless technology, can provide a user with a channel for nearly instantaneous access to a wealth of information from a repository of web sites and servers located around the world. Such a system, as well, allows a user to not only gather information, but also to provide information to disparate sources. As such, online data storing, management, and accessing has become increasingly popular.

Consumer data can be stored in a variety of formats offering access to a plurality of entities. Extensible markup language (XML) and other data storage, access, and management technologies have emerged to provide a hierarchical structure to data; the hierarchical structure provides an intuitive format to the data to facilitate programmatic access thereto. Both hierarchical and relational storage have benefits and drawbacks. One drawback of XML is that XML data is typically stored in memory to facilitate programmatic access, which can become burdensome if the XML file is too large to fit in memory and/or is streamed in from an external data source. Relational data, however, can be stored persistently and queried when desired without utilizing a significant portion of volatile storage.

However, XML queries can be more efficient due to the storage in volatile memory and XML can be friendlier in regard to providing programmatic access, but, as XML files become large, processing and storing them in volatile memory can have a negative affect on system resources. XML is desirable as a method for storing, accessing, and communicating data; thus allowing data in XML format, or other nested hierarchical format, to be seamlessly and efficiently stored in a persistent storage, such as relational storage, while maintaining its hierarchical structure can satisfy the current deficiencies of the language. Current systems aim to store XML code in the database itself, but this requires extra steps of indexing the data as it comes in and allowing queries on the index, which may or may not produce desired results. This can also damage the hierarchical order of the XML depending on how the document or stream is broken up and stored. One issue that has been heretofore unsolved is how to process a nested stream, such as XML, into a differently shaped stream, such as a relational database stream, while staying true to the hierarchy and order.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Reshaping of nested streams into other structures and formats is provided to facilitate alternative storage thereof, in one embodiment. The stream can be in substantially any nested/hierarchical format (such as extensible markup language (XML), for example) and can be output to substantially any format. The output format can be flat, for example, such that the nesting/hierarchy and order of the original stream can be preserved using data relating to the flat structure. The input stream can be consumed and transformed, upon consumption, to a disparate format. The disparately formatted stream can be pushed to one or more output streams to facilitate alternative storage of the stream, for example.

In one embodiment, the input stream can be a nested stream, such as XML and storage thereof to a relational database can be desired. This can be advantageous as relational databases can typically offer persistent storage, thus taking the stream out of volatile memory for conservation of memory. In this embodiment, the nested stream can be read and interpreted for indication of one or more stop elements, consumption of which can cause an action on the stream. The action can be a transformation of a portion of the stream to a disparate structure for storage of the portion. In one embodiment, a specified portion can be transformed into a relational format utilizing primary (and/or foreign) keys to preserve the hierarchy of the stream. Additionally, the stream can be read one full XML element at a time to facilitate asynchronous processing and storage thereof within the relational data store without sacrificing hierarchy and order of the data. In this regard, the data can be restructured to its original form in the stream for processing access requests to the data.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Processing of data streams into disparately structured data streams is provided to facilitate alternative storage thereof. Such restructuring can be seamless to an accessing entity such that access can be provided to the disparately structured data stream in the substantially the same manner as for the original data stream. Additionally, requests for access can be made in substantially the same manner regardless of the structure of the disparately structured stream. In this regard, the stream can be restructured and stored in another format (or multiple other formats) but accessed in the same manner. It is to be appreciated that the accessing entity can also request access to the data using methods related to the disparate structure of the data.

In one embodiment, the data stream can be read (such as by subscription) and/or pulled (such as by request/response) from a data source. The stream can be transformed into one or more streams of disparate structure and/or format; the disparately structured/formatted stream can be pulled by or pushed to another data reader, for example. This can be useful in a scenario where a data stream is large and/or increasing in size such that a finite amount of memory is challenged. In this scenario, the data stream can be consumed and off-loaded into a disk storage type of format. The component or application reading the stream, then, can have a finite amount of memory and can leverage one or more other components/applications having virtually infinite storage, for instance. In one example, an extensible markup language (XML) document/stream can be read and transformed into multiple tables and rows in a relational database. The transformation can preserve the order and layout of the XML while breaking the document into logical structures for storage in the database. As mentioned, a call to an application to retrieve the XML can produce the same result whether or not the XML has been transformed into relational database tables/rows.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
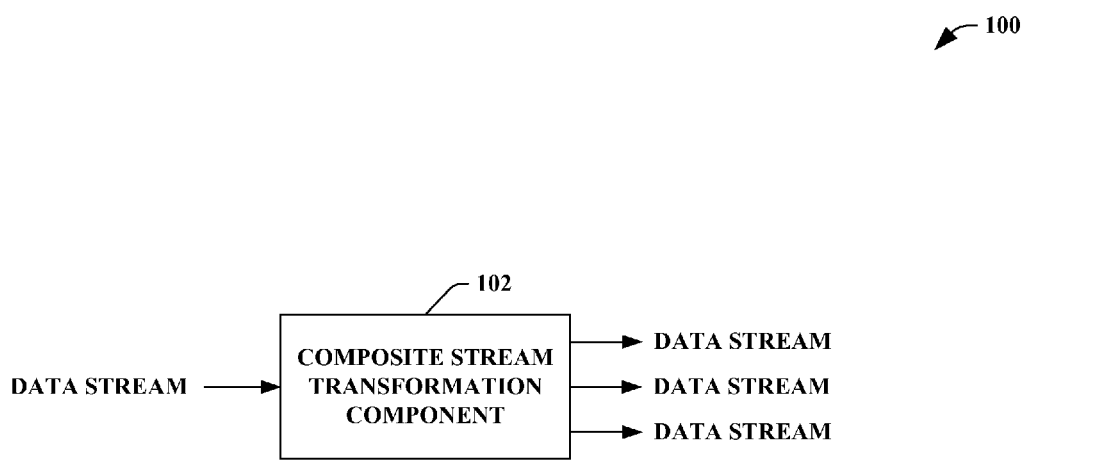
FIG. 1 illustrates a block diagram of an exemplary system that transforms a data stream into one or more disparate streams.

Now turning to the figures, FIG. 1 illustrates a system 100 that facilitates transforming a data stream into one or more disparately formatted/structured data streams. A composite stream transformation component 102 is provided that takes a data stream as input (e.g. by subscription and/or request/response) and transforms the stream into one or more disparately formatted or structured streams. In one embodiment, the data stream is provided as input into main memory of the composite stream transformation component 102. The composite stream transformation component 102 can read the stream and transform the stream into one or more disparately formatted structures for storage in an alternative medium, for example. This can facilitate off-loading the stream to handle memory constraints; in this regard, the data stream can be large and the composite stream transformation component 102 can have a finite memory, for example. Off-loading the stream to other storage in a different format can allow the data to be retained having little effect on the composite stream transformation component 102 memory or a component/application implementing such functionality.

When transforming the data stream to another format and storing it in a disparate medium, the composite stream transformation component 102 can keep the logical structure of data. Thus, when a request for the data is processed, the data can be obtained from the disparate storage medium and transformed from the disparate format to the original format as if the alternative transformation and storage were not performed. In this way, the process can be seamless to a requesting entity. This storage transformation process, however, can allow large data streams normally loaded into memory to be off-loaded for access thereof where the memory cannot efficiently handle the data stream. In addition, providing an off-loading format with efficient querying capability can make the transformation process more seamless, such as a relational database.

In one embodiment, the data stream can be an XML stream, for example. The stream can be a large file and/or an infinite stream (such as a stock/news ticker, for instance). As the file increases in size, or as the stream keeps pushing data out, the available memory of the composite stream transformation component 102 (or an application running the component) can continually decrease. However, in some applications, a full load of the XML stream in memory is desired for subsequent data access/retrieval. Thus, off-loading the stream to a more fixed storage medium, such as a disk, can allow the stream to be continually consumed without dropping portions of the stream or pausing to archive the data. In one embodiment, the data can off-loaded to a relational database thus providing efficient querying capabilities as well. This can make the process seamless to a user of the data, for example. In this embodiment, the data can be consumed by an application or user from the composite stream transformation component 102, which consumes the data from the data stream. Access to the data can be provided regardless of whether the portion of the stream requested is in memory of the composite stream transformation component 102 and/or in off-loaded storage.

It is to be appreciated that this is one embodiment of a use case pertaining to the subject matter described herein. Other formats can be used for both the incoming and outgoing data streams. Additionally, one or more outgoing data streams can be an input data stream to another composite stream transformation component 102. As mentioned above, the transformation process can retain the structure of the data. In the XML example, the hierarchy and order of items in the file can be retained when transforming the data to relational database tables and rows, for example. Thus, requesting the data can produce the database stored data in substantially the same format as if the data was retrieved from the original data stream. Additionally, requests for data can be in the form of XML and/or relational database query in the XML example provided, for instance.

Figure 2:
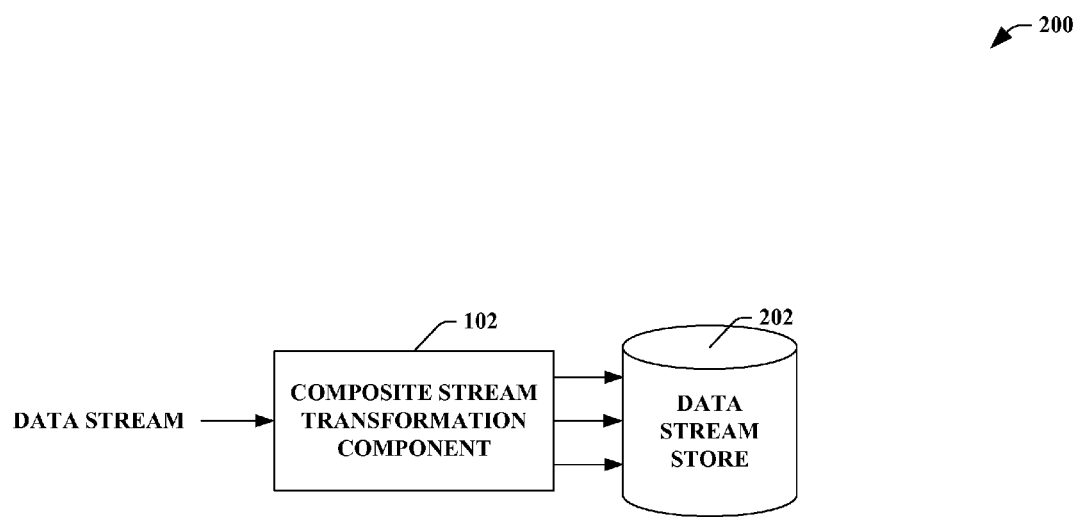
FIG. 2 illustrates a block diagram of an exemplary system that stores a data stream in a disparate format in a disparate data store.

Referring to FIG. 2, a system 200 for transforming a data stream into one or more data store entries is displayed. A composite stream transformation component 102 is displayed that inputs a data stream, transforms the stream, or a portion thereof, and outputs the transformation to a data stream store 202 in one or more output data streams. In one embodiment, the data stream input into the composite stream transformation component 102 can be a constant stream or a large file. The composite stream transformation component 102 can transform the data stream into one or more output streams. The output streams can be in the format of data stream store 202, for example. The output streams can be stored in the data stream store 202 and dropped from the memory of the composite stream transformation component 102. In this regard, neither the stream as input nor the streams as output are retained in the composite stream transformation component 102.

The data stream input into the composite stream transformation component 102 can come by way of subscription (e.g. notification events of new data and/or callback behavior) and/or as response to a request (from the composite stream transformation component 102 or other component, for instance). For example, the input can be a file (such as a data file too large for composite stream transformation component 102 memory) and/or a constantly updating stream. It is to be appreciated that the subject matter described herein is operable with substantially any size or type of file; rather large files can facilitate discussion of one useful embodiment. Example input can be substantially any streaming data, such as a news/stock ticker, a media file (such as audio and/or video), sensor data (such as for many automation architectures), medical information (such as patient data scrolling in a hospital room, for example), airspace flight data (such as positions and other metrics), and/or the like. To this end, the input data can also be substantially any data that can be taken as a function of time as well, such as fitness data, computer input data, simulation data, driving data, network traffic data, and/or the like, for example.

In one embodiment, only some of the data can be desired such that the composite stream transformation component 102 can retain the desired data and discard extraneous data. It is to be appreciated that the composite stream transformation component 102 need not necessarily actively discard the extraneous data, rather the stream can be read and does not need to be stored in the first place; in this regard the extraneous data can simply be ignored. In this embodiment, the composite stream transformation component 102 can stop the stream at points of interest and transform the portion until an identifier is reached indicating the end of the point of interest. This process can continue while the stream is live (e.g. constantly updating and/or offering connection thereto, for example). In one embodiment, the points of interest can correspond to a single output stream, for example. In one embodiment, the point of interest can trigger an event in the composite stream transformation component 102 to stop the stream and begin transformation, for example.

Additionally, the data stream being input can be nested and/or have a hierarchical structure such that points of interest can occur before one point of interest ends. To preserve the structure of the data stream, the composite stream transformation component 102 can transform the stream, as mentioned, to disparate output streams relating to the points of interest. In this regard, a hierarchical/nested structure can be maintained when storing the stream in a flat structure. For example, a stream can be opened for a point of interest, and another point of interest can appear, opening another stream for the second point of interest. The stream for the second point can close (e.g. by an ending indicator for the point of interest) causing the output stream related to the second point of interest to be completely transformed and closed. Information pertaining to the other open streams can also be written to identify the second point of interest as related (a child, for example) to the stream still open. Subsequently, an ending indicator for the first stream can be reached causing the first stream to be completely transformed and closed.

In one embodiment, the data stream input is hierarchical, such as an XML stream or document, having a plurality of tags indicating starting and ending of elements. The elements can be nested such to indicate hierarchy. The stream can be input into the composite stream transformation component 102 (e.g. by pulling or pushing) and the start/end tags can be consumed until a point of interest element is reached. Subsequently, a stream relating to the element can be opened, and data consumed corresponding to the element can be transformed to a disparate structure, such as a relational database table/row, and output accordingly. In one embodiment, the data stream store 202 can be a relational database having tables relating to points of interest and rows comprising the related data, for example (the data stream store 202 can be distributed as well). Thus, the composite stream transformation component 102 can open a stream relating to a table corresponding to an element or point of interest. If another point of interest is consumed before the first is closed (by an end tag in the XML example), a new stream can be opened corresponding to a table relating to the second point of interest. When an ending element is encountered for the second stream, the desired related data can be output to the stream (and hence as rows to the database table, for example). The output can include, for example, data regarding the first point of interest to indicate hierarchy (e.g. that the second point of interest is a child of the first point of interest). Subsequently, an end tag for the first point of interest can be reached causing the related stream to be written and closed.

It is to be appreciated that error checking can be present in the transformations performed by the composite stream transformation component 102 as well, such that, for example, where an end tag for the first point of interest is reached before the end tag for the second point of interest (indicating a nesting error), the second point of interest can be closed. Additionally, the output stream can be in substantially any format or architecture where the format or architecture is different from the data stream as input (such as relational, flat-file, tab-delimited file, comma separated value file, JavaScript object notation (JSON), representational state transfer (REST), XML, etc.). Additionally, as mentioned, elements can be ignored, and thus, not included in the output stream, for instance. Also, accessing mechanisms can be implemented to allow access to data stored in the output format from requests based on the input format. Moreover, the composite stream transformation component 102 can be configurable and/or utilized with an interface to provide customization thereof. Additionally, inference can be used to define transformations, at least in part, based on previous uses, for example. In one embodiment of the subject matter as described, the composite stream transformation component 102 can comprise a reader for the data stream as well as a reader for the streams output to the data stream store 202. The reader of the data stream can read an entire available segment of the stream, for example, and the reader for the output streams can traverse the read stream one element at a time. Thus, in the XML example, an available portion of the stream can be read by the composite stream transformation component 102, and then elements can be traversed one by one to create the output streams for the data stream store 202.

Figure 3:
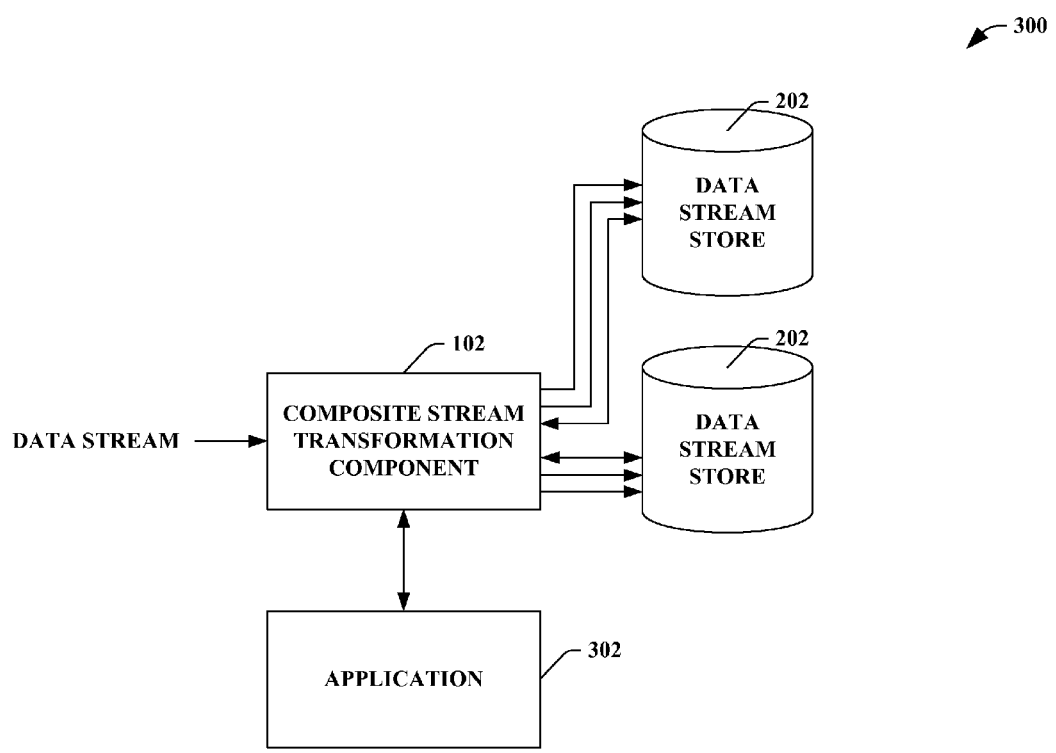
FIG. 3 illustrates a block diagram of an exemplary system that stores a data stream in a disparate format and provides subsequent access thereto.

Turning now to FIG. 3, a system 300 for storing a data input stream in a stream data store and providing access thereto is shown. A composite stream transformation component 102 is provided that pulls or is pushed a data stream and outputs a transformed version of the stream to one or more data stream store(s) 202. Additionally, an application 302 is provided that requests access to a portion of the data in the data stream. In one embodiment, the composite stream transformation component 102 receives a data stream as input and transforms the stream to one or more disparate formats for storage thereof in data stream store(s) 202; the transformation can shred the stream for relevant portions thereof, for example. The application 302 can desire access to a portion of the stream. In one embodiment, the request for access can be in a format corresponding to a format of the original data stream. The composite stream transformation component 102 can interpret the request and access the data stream store(s) (such as by query, for example) to obtain the desired data. It is to be appreciated that if the data is in the composite stream transformation component 102 (such as part of a point of interest being transformed), the composite stream transformation component 102 can return directly from the data stream as well.

For example, as mentioned, the data stream can be a news ticker implemented in really simple syndication (RSS—an embodiment of XML). As the news ticker stream comes in (as the data stream input into the composite stream transformation component 102), the data can be consumed looking for a point of interest, for instance. The points of interest can be defined by the application 302. In this regard, there can be a composite stream transformation component 102 specific to a given application 302, for example. In addition, multiple composite stream transformation components 102 can pull on (or receive subscription notifications from) one data stream and output one or more streams accordingly, for example. In one embodiment, there can be some information in a stream the application 302 does not need to access and/or the composite stream transformation component 102 deems unnecessary, such as keywords, related news stories, or other information that can be specific to one embodiment. Thus, the composite stream transformation component 102 can define stops in the stream to correspond to points of interest and specify portions of the stream to be extracted at the points of interest. In this regard, consuming a point of interest can trigger an event (such as a callback function, for example), to process the data in the stream relating to the point of interest. In this example, the composite stream transformation component 102 can detect the point of interest and extract relevant information outputting such to one or more data streams into one or more data stream store(s) 202, for example. Additionally, as mentioned, the composite stream transformation component 102 can transform the stream such that the hierarchical structure is preserved. For example, RSS (and XML) can have nested related elements, such to create a hierarchy of elements. The hierarchy can be preserved by storing relationship related information (such as parent, child, and/or sibling information) with a point of interest when outputting to the data stream store(s) 202.

The application 302 can request a portion of the data stream as stored in the data stream store(s) 202, for example. The request can be processed by the composite stream transformation component 102, for instance, by querying the data stream store(s) 202 for the requested data. In one embodiment, the resulting data can be transformed into the type and/or format of the original stream to make the transformation seamless to outside applications and other requestors, for example. In this regard, the composite stream transformation component 102 can have finite memory as streams can be discarded once output to the data stream store(s) 202, for example. As mentioned, where the data has a hierarchical or nested format, this format can be preserved in the data stream store(s) 202. For example, where the store(s) 202 are relational databases, primary keys can be defined in a table related to a point of interest and utilized by other tables related to children (or nested) points of interest (as a field thereof, for example) to keep the relationship hierarchy. In this regard, a query from the composite stream transformation component 102 to the data stream store(s) can render one or more database rows in this example. The row can have a related key that can be utilized to locate information about parents or children of the element in the original hierarchy, for example.

Figure 4:
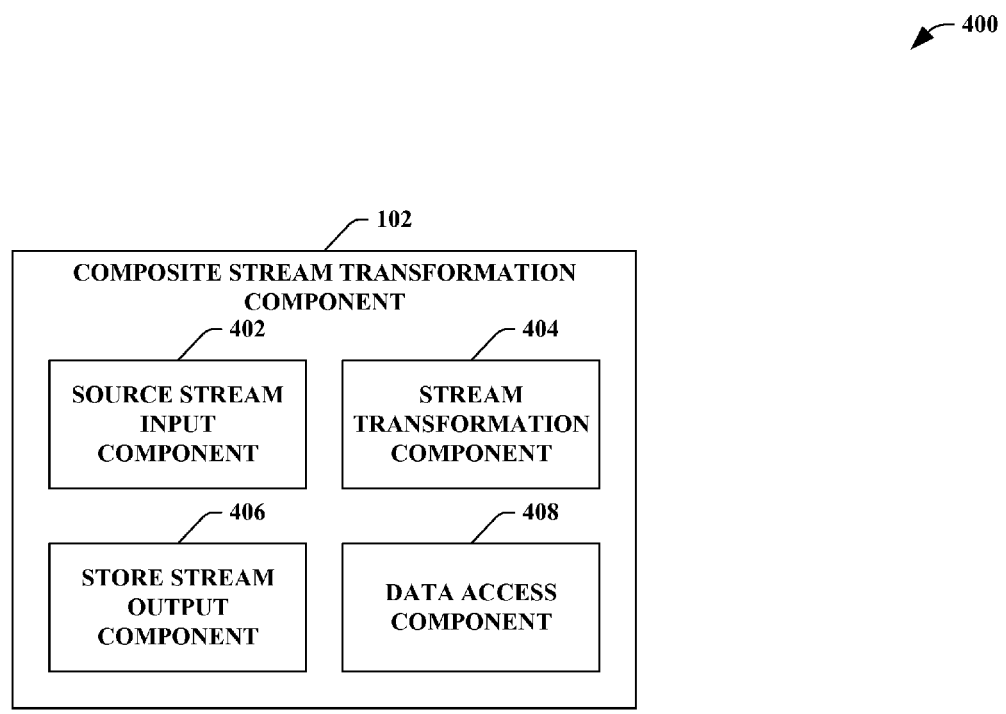
FIG. 4 illustrates a block diagram of an exemplary composite stream transformation component.

Referring now to FIG. 4, a system 400 for transforming streams and providing subsequent access to stream data is displayed. A composite stream transformation component 102 is provided having a source stream input component 402 that takes a stream as input, a stream transformation component 404 that transforms the input stream to at least one disparate format, a store stream output component 406 that outputs the disparately formatted streams to one or more outputs or stores, and a data access component 408 that facilitates subsequent access to the data. In one embodiment, the source stream input component 402 can pull a source data stream and stop upon reaching the start or end of a point of interest. The transformation component 404 can transform the stream, or a portion thereof (e.g. relevant fields) to a disparate format and/or architecture and the store stream output component 406 can store the transformed streams. Subsequently, the data access component 408 can field requests for data and return appropriate results.

The source stream input component 402 can take a stream as input by substantially any method including request/response, subscription request (resulting in notification of new data, for example), pulling a specified portion, etc. In one embodiment, the source stream input component 402 pulls the stream as a result of a request from one or more components or applications, for example. Additionally, the source stream input component 402 can pull for data, for example, based in part on a pull request to a disparate data store that houses data output by the store data output component 406, for example. In another embodiment, the source stream input component 402 can stop the stream, for example, upon reaching a desired item (an item of interest, for example). Upon stopping the stream, for instance, the item of interest can be read in full (e.g. until an element indicating the end of the item of interest) or incrementally until an end point is reached.

The stream transformation component 404 can consume the stream data; the data can be related to one or more points of interest, for example. The consumed data, or a portion thereof, can be transformed to one or more disparate types for input into a disparate structure, for example. The disparate structure can be stored such to allow virtually endless storage, for example, thus allowing the stream to be accessible while not increasingly utilizing memory of a component, such as the composite stream transformation component 102. In fact, once the stream is input and transformed, the stream can be output (by the store stream output component 406, for example) and then disposed of. Thus, the memory of the composite stream transformation component 102, or a system, component, or application associated therewith, can be finite since neither the input stream nor the output stream remains in memory. In this regard, the stream transformation component 404 can be considered a reader, in effect, as well like the source stream input component 402. While the source stream input component 402 can consume an available portion of the stream (which can be one or more elements), the stream transformation component 404 can advance the consumed stream an element at a time, transforming selected portions for output thereof to the store stream output component 406. The dual or multiple reading can have a domino effect, for example, where a component or application can cause the stream transformation component 404 to read an element (such as by accessing the data stream store or store stream output component 406, for example) which can cause the source stream input component 402 to read a portion of the data input stream, for instance.

The store stream output component 406 can persist the transformed instances of the stream to one or more disparate storage types/formats on one or more disparate storage devices, for example, to facilitate long-term storage, redundant storage, and/or alternative storage of the data stream, for example. The output format can be substantially any output format, and a hierarchical structure of the data, if existent, can be maintained. Additionally, where the input data is relational, the relationships can be maintained in the transformation and output of the data by the store stream output component 406 as well. For example, where the data is related by primary and/or foreign keys, the key information can be use to provide a hierarchy to the data when stored in a hierarchical or nested format (such as XML), for example. The stream store output component 406 can output the data in a number of streams, and the streams can correspond to one or more entities related to the store as well. Conversely, for example, where the data is output to a relational database, streams can be open by the store stream output component 406 for each element of interest, for example. The stream can relate to and insert data as a row within a table, for example. In this regard, items of interest can be stored together in the table and keys can be used to retain nesting and/or hierarchical format of the input data stream.

The data access component 408 can facilitate subsequent access of the data stored in the data stream stores by the stream store output component 406, for example. In one embodiment, the data can be returned in substantially the same format as it was in the input data stream, for example. Thus, where the data in the input data stream was hierarchical in nature, the hierarchy can be retained even where the data is output to a flat format (such as a relational database or file-based format). One way to effectuate this while still providing efficient transformation of the stream is to allow the stream transformation component 404 to retrieve a complete row as a stream. This correlates to receiving an entire stream of related elements in a single retrieval such that the order can be preserved but stream processing and transformation can continue with respect to the stream. In XML, for example, this can entail reading an entire point of interest tag (which can comprise other point of interest tags) before processing such to retain the hierarchy and order. In this regard, the point of interest stream can be processed together as a group and stream input/transformation can continue. In one embodiment, the first point of interest reached in each case can be read as a single row ensuring that the hierarchy is maintained for the highest level items on down. Additionally, other schemes can be utilized as well, for example for higher-level nodes that are not high in number in the stream but have a number of children. In this regard, the children can be read as single rows (along with embedded points of interest). It is to be appreciated that this can be configurable and/or machine-learning can be utilized to decide efficient methods of using this technology.

Additionally, the data can be flat in the input stream and going to a hierarchical structure (or another flat structure, for example). Where the data was flat in the input data stream and perhaps had a relational aspect to it, the relationships between the data can be retained, for example, if the data is stored in a hierarchical format (such as by nesting, for example). Similar methods can be used to effectuate this converse behavior as well. For this reason, when data access is requested from the data access component 408, it can be returned in substantially the same format as it originally came in as the structure of the data can be retained in other formats using other syntax, for instance.

Figure 5:
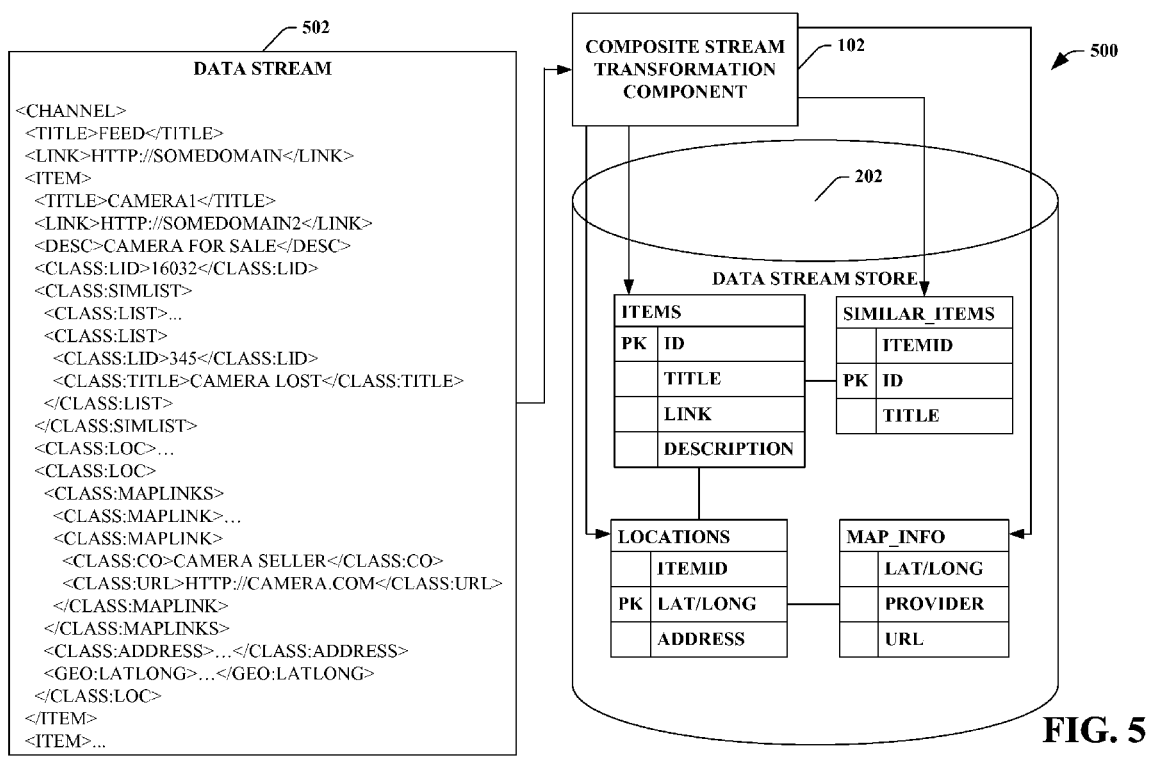
FIG. 5 illustrates a block diagram of an exemplary system that restructures a nested data stream for storage in a relational store.

Now referring to FIG. 5, a system 500 for transforming an XML stream into a relational database is illustrated as one example embodiment of the subject matter described herein. In this example, a data stream 502 is provided in a nested format (such as XML), which is consumed by a composite stream transformation component 102. The composite stream transformation component 102 transforms the data and outputs it on one or more streams into a data stream store 202, which stores the streams in a relational database in this example to facilitate subsequent querying thereof. The example provides database tables for items, similar items, location, and map info; the composite stream transformation component 102 can identify stops in the XML stream relating to the elements that correspond to the table, as well as identify wanted information from the elements of interest. The following pseudo-code can facilitate this functionality where the XML stream 502 can be named "expo.xml."

```
Sub Main( )
    Dim conn As New SqlConnection("server=...; database=...;")
    Conn.Open( )
    'Set up stream stops
    Dim channel = New XDataElement("CHANNEL")
    Dim item = New XDataElement("ITEM")
    Dim locs = New XDataElement(GetXmlNamespace(CLASS) +
        "LOC")
    'Set up mapping of elements to tables
    Dim itemsLoader = New TableLoader("ITEMS", AddressOf
        CreateItemRow)
    Dim similarItemsLoader = New TableLoader("SIMILAR_ITEMS",
        AddressOf CreateSimilarItemsRow)
    Item.Add(itemsLoader, similarItemsLoader)
    Dim locationsLoader = new TableLoader("LOCATIONS",
        AddressOf CreateLocationRow)
    Dim mapInfoLoader = New Tableloader("MAP_INFO", AddressOf
        CreateMapInfo)
    locs.Add(locationsLoader, mapInfoLoader)
    'load
    Dim xBulkLoader =
        XSQLBulkLoader.LoadXMLStream("expo.xml",
        conn, channel, item, locs)
    xBulkLoader.Execute( )
End Sub( )
Function CreateItemRow(ByVal item As XElement) As Object( )
Return New
    Object( ) {item.<CLASS:LID>.Value, item.<TITLE>.Value,
    item.<LINK>.value, item.<DESC>.Value}
End Function
Function CreateSimilarItemsRow(ByVal item As XElement) As
Object( ) ( )
    Return (From similarItem In
    item.<CLASS:SIMLIST>.<CLASS:LIST>
        Select New Object( ) {item.<CLASS:LID>.Value,
        similarItem.<CLASS:LID>.Value,
        similarItem.<CLASS:TITLE>.Value}).ToArray( )
End Function
Function CreateLocationRow(ByVal location As XElement) As Object( )
    Return New Object( ) {location.Parent.<CLASS:LID>.Value,
    location.<GEO:LATLONG>.Value,
    location.<CLASS:ADDRESS>.Value}
End Function
Function CreateMapInfo(ByVal location As XElement) As Object( ) ( )
    Return (From map In
    location.<CLASS:MAPLINKS>.<CLASS:MAPLINK>
        Select New Object( ) {location.<GEO:LATLONG>.Value,
        map.<CLASS:CO>.Value,
        map.<CLASS:URL>.Value}).ToArray( )
End Function
```

In the foregoing pseudo-code, a database connection is instantiated for streaming the XML thereto. Subsequently, stream stops are setup as described herein as points or elements of interest. The "CHANNEL," "ITEM," and "CLASS: LOC" tags are specified as stop points. It is at these points the input stream can stop and the composite stream transformation component 102 can process the stream into one or more output streams. This can act as a trigger, for example, and call the function pointers as shown in the code, CreateItemRow, CreateSimilarItemsRow, CreateLocationRow, and CreateMapinfo. A plurality of TableLoaders are created that call the function pointers for the respective output streams (or database tables, in this case) upon trigger from the XML stream consumption. Thus, for example, when "ITEM" is consumed (the start tag or the end tag, for example), the TableLoader is triggered and calls the CreateItemRow and CreateSimilarItemsRow functions, which return database rows using the data in the XML stream.

The following pseudo-code can be used to implement the portion of the composite stream transformation component 102 that reads the XML stream.

```
using System;
using System.Collections;
using System.Collections.Generic;
using System.IO;
using System.Linq;
using System.Xml;
using System.Xml.Linq;
namespace System.Xml.Linq
{
  class StreamLoader
  {
    class StreamIterator : IEnumerable<XElement>
    {
      StreamLoader loader;
      int index;
      internal XElement source;
      public StreamIterator(StreamLoader loader, int index, XElement source)
      {
        this.loader = loader;
        this.index = index;
        this.source = source;
      }
      public IEnumerator<XElement> GetEnumerator( )
      {
        if (loader.index != index - 1 || (index - 1 >= 0 &&
loader.iterators[index - 1] != null && loader.iterators[index -
1].source != source)) yield break;
        int depth = loader.baseDepth + index + 1;
        XName name = loader.streamNames[index];
        XName streamName = loader.streamNames.Length > index +
1 ? loader.streamNames[index + 1] : null;
        if (loader.SkipContentUntil(depth, name))
        {
          loader.iterators[index] = this;
          loader.index = index;
          do
          {
            source = new XElement(name);
            loader.ReadElementUntil(source, streamName);
            if (streamName != null)
            {
              source.AddAnnotation(loader);
            }
            yield return source;
            if (loader.iterators[index] != this) yield break;
            if (loader.index != index)
            {
              for (int i = index + 1; i <= loader.index; i++)
              {
                loader.iterators[i] = null;
              }
              loader.index = index;
            }
          } while (loader.SkipContentUntil(depth, name));
          loader.iterators[index] = null;
          loader.index = index - 1;
        }
      }
```

```
      IEnumerator IEnumerable.GetEnumerator( )
      {
        return (IEnumerator)GetEnumerator( );
      }
    }
    XmlReader reader;
    int baseDepth;
    XName[ ] streamNames;
    StreamIterator[ ] iterators;
    int index;
    public StreamLoader(XmlReader reader, XName[ ] streamNames)
    {
      this.reader = reader;
      this.baseDepth = reader.Depth;
      this.streamNames = streamNames;
      this.iterators = new StreamIterator[streamNames.Length];
      this.index = -1;
    }
    public IEnumerable<XElement> Stream(XElement e)
    {
      if (index >= 0 && iterators[index].source != e) return
XElement.EmptySequence;
      return new StreamIterator(this, index + 1, e);
    }
    public void ReadElementUntil(XElement source, XName match)
    {
      if (reader.MoveToFirstAttribute( ))
      {
        do
        {
          XNamespace ns = reader.Prefix.Length == 0 ?
XNamespace.Blank : XNamespace.Get(reader.NamespaceURI);
          source.Add(new XAttribute(ns.GetName(reader.LocalName),
reader.Value));
        } while (reader.MoveToNextAttribute( ));
        reader.MoveToElement( );
      }
      if (!reader.IsEmptyElement)
      {
        reader.Read( );
        if (match != null)
        {
          if (ReadPrologUntil(source, match)) return;
        }
        else
        {
          ReadContent(source);
        }
      }
      reader.Read( );
    }
    void ReadContent(XElement source)
    {
      if (reader.NodeType != XmlNodeType.EndElement)
      {
        do
        {
          source.Add(XNode.ReadFrom(reader));
        } while (reader.NodeType != XmlNodeType.EndElement);
      }
      else
      {
        source.Add(string.Empty);
      }
    }
    bool ReadPrologUntil(XElement source, XName match)
    {
      if (reader.ReadState != ReadState.Interactive) throw new
InvalidOperationException("The reader state should be Interactive.");
      do
      {
        switch (reader.NodeType)
        {
          case XmlNodeType.Element:
            XName name =
XNamespace.Get(reader.NamespaceURI).GetName(reader.LocalName);
            if (name == match) return true;
            XElement e = new XElement(name);
            if (reader.MoveToFirstAttribute( ))
            {
```

```
            do
            {
                XNamespace ns = reader.Prefix.Length == 0 ?
XNamespace.Blank : XNamespace.Get(reader.NamespaceURI);
                e.Add(new
XAttribute(ns.GetName(reader.LocalName), reader.Value));
            } while (reader.MoveToNextAttribute( ));
            reader.MoveToElement( );
        }
        source.Add(e);
        if (!reader.IsEmptyElement)
        {
            reader.Read( );
            ReadContent(e);
        }
        break;
    case XmlNodeType.EndElement:
        return false;
    case XmlNodeType.Text:
    case XmlNodeType.SignificantWhitespace:
    case XmlNodeType.Whitespace:
    case XmlNodeType.CDATA:
    case XmlNodeType.Comment:
    case XmlNodeType.ProcessingInstruction:
    case XmlNodeType.DocumentType:
        break;
    case XmlNodeType.EntityReference:
        reader.ResolveEntity( );
        break;
    case XmlNodeType.EndEntity:
        break;
    default:
        throw new InvalidOperationException(String.Format("The reader should not be on a node of type '{0}'.", reader.NodeType));
    }
} while (reader.Read( ));
return false;
}
bool SkipContentUntil(int depth, XName match)
{
    if (reader.ReadState != ReadState.Interactive) return false;
    do
    {
        int d = reader.Depth;
        if (d == depth)
        {
            if (reader.NodeType == XmlNodeType.Element)
            {
                XName name =
XNamespace.Get(reader.NamespaceURI).GetName(reader.LocalName);
                if (name == match) return true;
            }
        }
        else if (d < depth)
        {
            break;
        }
    } while (reader.Read( ));
    return false;
    }
}
public static class StreamExtensions
{
    public static XElement LoadStream(string uri, XName rootName,
params XName[ ] streamNames)
    {
        return LoadStream(XmlReader.Create(uri,
GetXmlReaderSettings( )), rootName, streamNames);
    }
    public static XElement LoadStream(TextReader textReader, XName
rootName, params XName[ ] streamNames)
    {
        return LoadStream(XmlReader.Create(textReader,
GetXmlReaderSettings( )), rootName, streamNames);
    }
    public static XElement LoadStream(XmlReader reader, XName
rootName, params XName[ ] streamNames)
    {
        XElement source = new XElement(rootName);
        StreamLoader loader = new StreamLoader(reader, streamNames);
        XName streamName = streamNames.Length > 0 ?
streamNames[0] : null;
        loader.ReadElementUntil(source, streamName);
        if (streamName != null)
        {
            source.AddAnnotation(loader);
        }
        return source;
    }
    public static IEnumerable<XElement> Stream(this XElement source)
    {
        StreamLoader loader = source.Annotation<StreamLoader>( );
        return loader.Stream(source);
    }
    public static IEnumerable<XElement> Stream(this
IEnumerable<XElement> source)
    {
        if (source == null) throw new ArgumentNullException("source");
        return Enumerable.SelectMany(source, e => e.Stream( ));
    }
    static XmlReaderSettings GetXmlReaderSettings( )
    {
        XmlReaderSettings readerSettings = new XmlReaderSettings( );
        readerSettings.ProhibitDtd = false;
        readerSettings.IgnoreWhitespace = true;
        return readerSettings;
    }
}
}
```

The foregoing code can receive a list of elements at which to stop while still progressing in the stream; the stop elements can be related to the points of interest, for example. The materialized XML data for a given node can be returned at each level, except that of the next stop element in the stream, for example. The following pseudo-code can be used to implement a data reader that transforms the XML into one or more relational database streams. In this example, the reader is called an XDataReader.

```
Imports System.Xml.Linq
Imports System
Imports System.Collections.Generic
Imports System.Data.SqlClient
Imports System.Data
Imports System.Xml.Linq.StreamExtensions
Namespace System.Xml.Linq
    Public Class XDataReader
        Implements IDataReader
#Region "Class members"
        Private xStream As IEnumerator(Of XElement)
        Private currentContext As XDataElement = Nothing
        Private currentElement As XElement
        Private currentRecord As Object( )
        Private currentTableLoader As TableLoader = Nothing
        Private xRowReader As New XRowReader( )
        Private dElements As IEnumerable(Of XDataElement)
        Private ancesotrsStack As Stack(Of XElement)
        Private tableLoaders As Dictionary(Of TableLoader,
SqlBulkCopy)
        Private isFirst As Boolean = True
        Private parentElement As XElement
#End Region
        Sub New(ByVal elements As IEnumerable(Of XElement),
ByVal loaders As Dictionary(Of TableLoader, SqlBulkCopy), ByVal
dataElements As IEnumerable(Of XDataElement), ByVal ancestors As
Stack(Of XElement), ByVal streamContext As XElement)
            tableLoaders = loaders
            xStream = elements.GetEnumerator( )
            currentContext = dataElements(0)
            dElements = dataElements.Skip(1)
            ancesotrsStack = ancestors
```

```
                parentElement = streamContext
        End Sub
        Public Sub Load( )
            currentTableLoader = currentContext.TableLoaders(0)
            If xStream.MoveNext( ) = True Then
                currentElement = xStream.Current
                If currentTableLoader IsNot Nothing AndAlso
currentContext.IsLeaf = True Then
                    parentElement.Add(currentElement)
                    currentRecord =
currentTableLoader.TableRowCreator(currentElement)
                    currentElement.Remove( )
tableLoaders(currentTableLoader).WriteToServer(Me)
                Else
                    While Me.Read( )
                    End While
                End If
            End If
        End Sub
        Public Function Read( ) As Boolean Implements
Data.IDataReader.Read
            If isFirst = True Then
                isFirst = False
                parentElement.Add(currentElement)
                If currentTableLoader IsNot Nothing Then
                    LoadSelf( )
                End If
                If dElements(0) IsNot Nothing Then
                    LoadChildren( )
                End If
                currentElement.Remove( )
                Return True
            End If
            If xStream.MoveNext( ) = True Then
                currentElement = xStream.Current
                parentElement.Add(currentElement)
                If currentTableLoader IsNot Nothing Then
                    LoadSelf( )
                End If
                If dElements(0) IsNot Nothing Then
                    LoadChildren( )
                End If
                currentElement.Remove( )
                Return True
            Else
                Return False
            End If
        End Function
        Private Sub LoadSelf( )
            currentRecord =
currentTableLoader.TableRowCreator(currentElement)
            If currentContext.IsLeaf = False Then
                xRowReader.Add(currentRecord)
tableLoaders(currentTableLoader).WriteToServer(xRowReader)
            End If
            'handle the case of more tables needs to be loaded from
the same element
            For Each tbl In currentContext.TableLoaders.Skip(1)
                If tbl.TableRowsCreator IsNot Nothing Then
                    For Each record In
tbl.TableRowsCreator(currentElement)
                        xRowReader.Add(record)
                        tableLoaders(tbl).WriteToServer(xRowReader)
                    Next
                Else
                    Dim record =
                    tbl.TableRowCreator(currentElement)
                    xRowReader.Add(record)
                    tableLoaders(tbl).WriteToServer(xRowReader)
                End If
            Next
        End Sub
        Private Sub LoadChildren( )
            ancesotrsStack.Push(currentElement)
            Dim xdReader =
            New XDataReader(currentElement.Stream( ),
tableLoaders, dElements, ancesotrsStack, currentElement)
            xdReader.Load( )
            ancesotrsStack.Pop( )
        End Sub
```
```
        #Region "Boiler code implementation of IDataReader"
    End Class
End Namespace
```

This function can utilize the TableLoaders from the first pseudo-code sample to create rows in the appropriate database tables according to the data in the XML stream. In this example, the reader implements a pull model where a reader of the output stream (e.g. of the XDataReader) can request a value to be written, which causes the reader of the XML stream to ask for the next value in the stream. Thus, there can be two ways to read a stream. One way is to read the entire available stream, and another way to read the stream is by reading one item or element at a time, for example. In this embodiment, the XML reader can read the entire available stream and then the XDataReader can read the stream one element at a time to store the relevant streams, for instance.

In this regard, a stream comprising a row can be formulated of related elements of the XML stream (such as an item of interest and its children). Thus, a pulling a stream can return a single row with the related XML elements. This can facilitate efficiently parsing the XML stream and retaining its hierarchical order by allowing consumption of the stream while processing each row; since the row is kept together, the hierarchy and order can be maintained. As described above, multiple schemes can be implemented to decide where this functionality should be implemented. For example, the first point of interest in each read can be read as a row to ensure all children hierarchy and order are retained. However, where the first point of interest is large and the transformation must wait a while before receiving the end tag, a child point of interest can be used instead. It is to be appreciated that one or more points of interest can be read as a row along with the embedded points of interest related thereto. Additionally, inference can be used to determine which points of interest must be read as a single row in this regard. This can be coded according to the following pseudo-code implemented within the XDataRow class represented in some of the foregoing pseudo-code, for example.

```
Public Class XRowReader
    Implements IDataReader
    Private currentRow As Object( )
    Private hasBeenRead As Boolean = False
    Public Sub Add(ByVal tableRow As Object( ))
        currentRow = tableRow
        hasBeenRead = False
    End Sub
    Public Function Read( ) As Boolean Implements
System.Data.IDataReader.Read
        If hasBeenRead = False Then
            hasBeenRead = True
            Return True
        End If
        Return False
    End Function
    #Region "Boiler code implementation of IDataReader"
End Class
```

Additionally, as shown in previous pseudo-code, an XDataElement class is provided to implement stopping the stream and returning the stopped element, as well as to define the shape of the relational stream output in this example. The XDataElement can be resembled by the following pseudo-code.

```
Public Class XDataElement
    Dim xname As XName
    Dim tblLoaders As TableLoader( ) = { }
    Dim isLeafElement As Boolean = False
    Public Sub New(ByVal elementName As XName)
        xname = elementName
    End Sub
    Public Sub Add(ByVal ParamArray tableLoaders As TableLoader( ))
        If tblLoaders.Length = 0 Then
            tblLoaders = tableLoaders
        Else
            Dim length = tblLoaders.Length
            ReDim Preserve tblLoaders(length + tableLoaders.Length)
            For i = 0 To tableLoaders.Length − 1
                tblLoaders(length + i) = tableLoaders(i)
            Next
        End If
    End Sub
    Public ReadOnly Property Name( ) As XName
        Get
            Return xname
        End Get
    End Property
    Public ReadOnly Property TableLoaders( ) As IEnumerable(Of
TableLoader)
        Get
            Return tblLoaders
        End Get
    End Property
    Friend Property IsLeaf( ) As Boolean
        Get
            Return isLeafElement
        End Get
        Set(ByVal value As Boolean)
            isLeafElement = value
        End Set
    End Property
End Class
```

This class leverages the TableLoader class to store and return TableLoaders associated with the transformation process. The TableLoader class can associate a table name with a function that returns an object array that represents a row to be output to the relational stream. In other embodiments, a similar loader method can be provided that associates callback functions with locations for the output streams such that when the point of interest is hit, the data can be transformed by the callback and transmitted to the output stream (and to the final destination, for example). The TableLoader class in this example can be implemented by the following pseudo-code (and/or coded as a hash table), for example.

```
Public Class TableLoader
    Dim tblName As String
    Dim rowCreator As Func(Of XElement, Object( )) = Nothing
    Dim rowsCreator As Func(Of XElement, Object( )( )) = Nothing
    Public Sub New(ByVal tableName As String, ByVal tableRowCreator
As Func(Of XElement, Object( )))
        tblName = tableName
        rowCreator = tableRowCreator
    End Sub
    Public Sub New(ByVal tableName As String, ByVal tableRowsCreator
As Func(Of XElement, Object( )( )))
        tblName = tableName
        rowsCreator = tableRowsCreator
    End Sub
    Public ReadOnly Property TableName( ) As String
        Get
            Return tblName
        End Get
    End Property
    Public ReadOnly Property TableRowCreator( ) As Func(Of XElement,
Object( ))
        Get
            Return rowCreator
        End Get
    End Property
    Public ReadOnly Property TableRowsCreator( ) As Func(Of XElement,
Object( )( ))
        Get
            Return rowsCreator
        End Get
    End Property
End Class
```

Additionally, a bulk loader class can be implemented to pull the components together to achieve the desired behavior in this example. The bulk loader, shown in the previous pseudo-code, starts the stream reading, transforming and output process. A sample bulk loader can be implemented like the following in conjunction with the other pseudo-code shown supra.

```
Imports System.Xml.Linq
Imports System
Imports System.Collections.Generic
Imports System.Data.SqlClient
Imports System.Data
Imports System.Xml.Linq.StreamExtensions
Public Class XSQLBulkLoader
    Private xeReader As XElement
    Private dbConnection As SqlConnection
    Private dtElements As XDataElement( )
    Private loaders As New Dictionary(Of TableLoader, SqlBulkCopy)
#Region "Create SQLBulkLoader methods"
    Public Shared Function LoadXmlStream(ByVal uri As String, ByVal
connection As SqlConnection, ByVal ParamArray dataElements( ) As
XDataElement) As XSQLBulkLoader
        Dim path = From dataElement In dataElements Select
dataElement.Name
        Return New
XSQLBulkLoader(StreamExtensions.LoadStream(uri,
path(0), path.Skip(1).ToArray( )), connection, dataElements)
    End Function
#End Region
    Private Sub New(ByVal inputXElementReader As XElement, ByVal
connection As SqlConnection, ByVal ParamArray dataElements As
XDataElement( ))
        If connection Is Nothing OrElse connection.State <>
ConnectionState.Open Then
            Throw New ArgumentException("The connection to the
database must be opened")
        End If
        dbConnection = connection
        xeReader = inputXElementReader
        dtElements = dataElements
        dtElements(dataElements.Count − 1).IsLeaf = True
        For Each ele In dtElements
            For Each tblLoader In ele.TableLoaders
                Dim c = New
SqlConnection(dbConnection.ConnectionString)
                c.Open( )
                Dim sqlBulkloader As New SqlBulkCopy(c)
                sqlBulkloader.DestinationTableName =
tblLoader.TableName
                loaders.Add(tblLoader, sqlBulkloader)
            Next
        Next
    End Sub
    Public Sub Execute( )
        Dim stack As New Stack(Of XElement)
        stack.Push(xeReader)
        Dim xdReader = New XDataReader(xeReader.Stream( ),
loaders, dtElements.Skip(1), stack, xeReader)
        xdReader.Load( )
    End Sub
End Class
```

It is to be appreciated that the subject matter as disclosed herein is not limited to the example and pseudo-code provided above. This is but one of many possible implementations in accordance with the components and methods described above as well as those described infra.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent, for instance by inferring actions based on contextual information. By way of example and not limitation, such mechanism can be employed with respect to generation of materialized views and the like.

Figure 6:
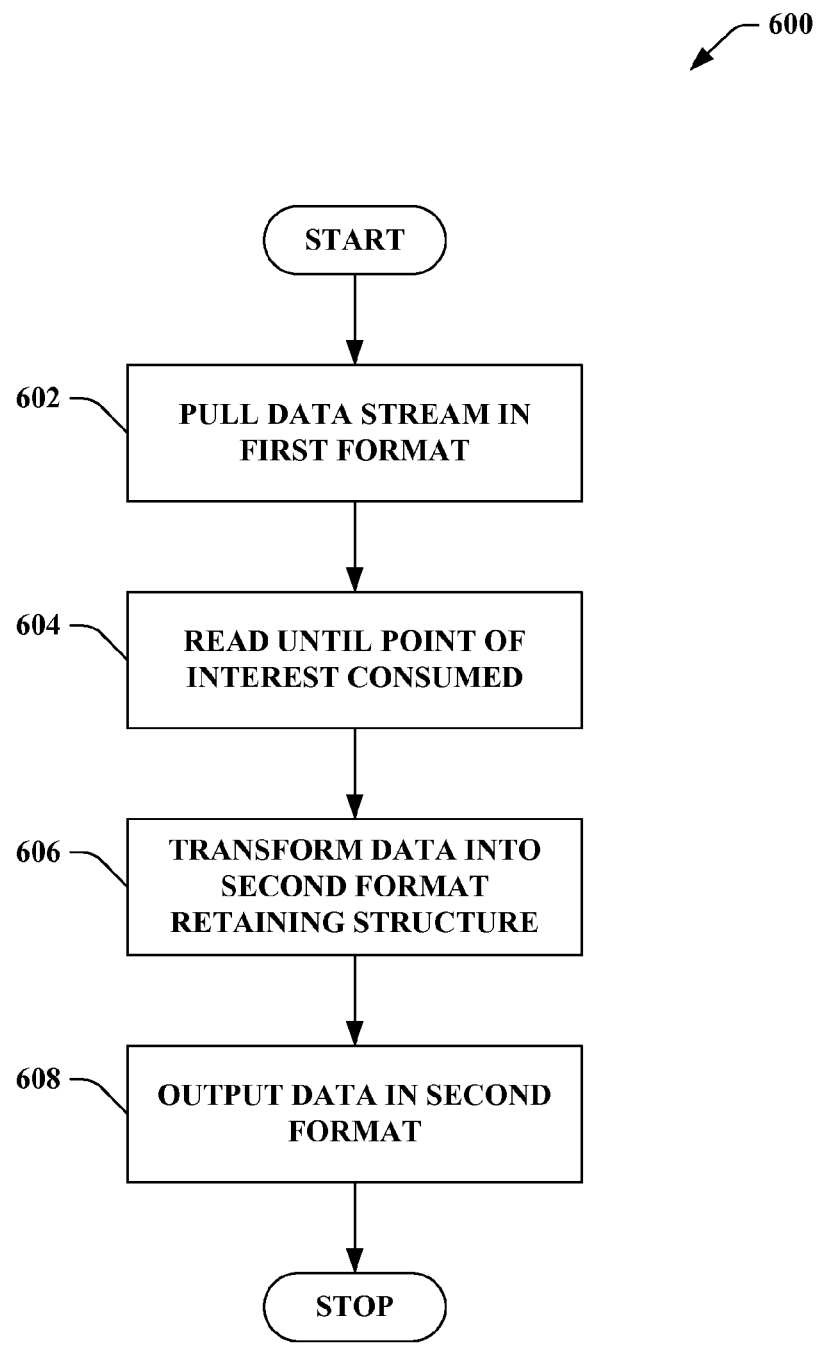
FIG. 6 illustrates an exemplary flow chart for transforming input streams to a disparate format for output thereof.
Figure 7:
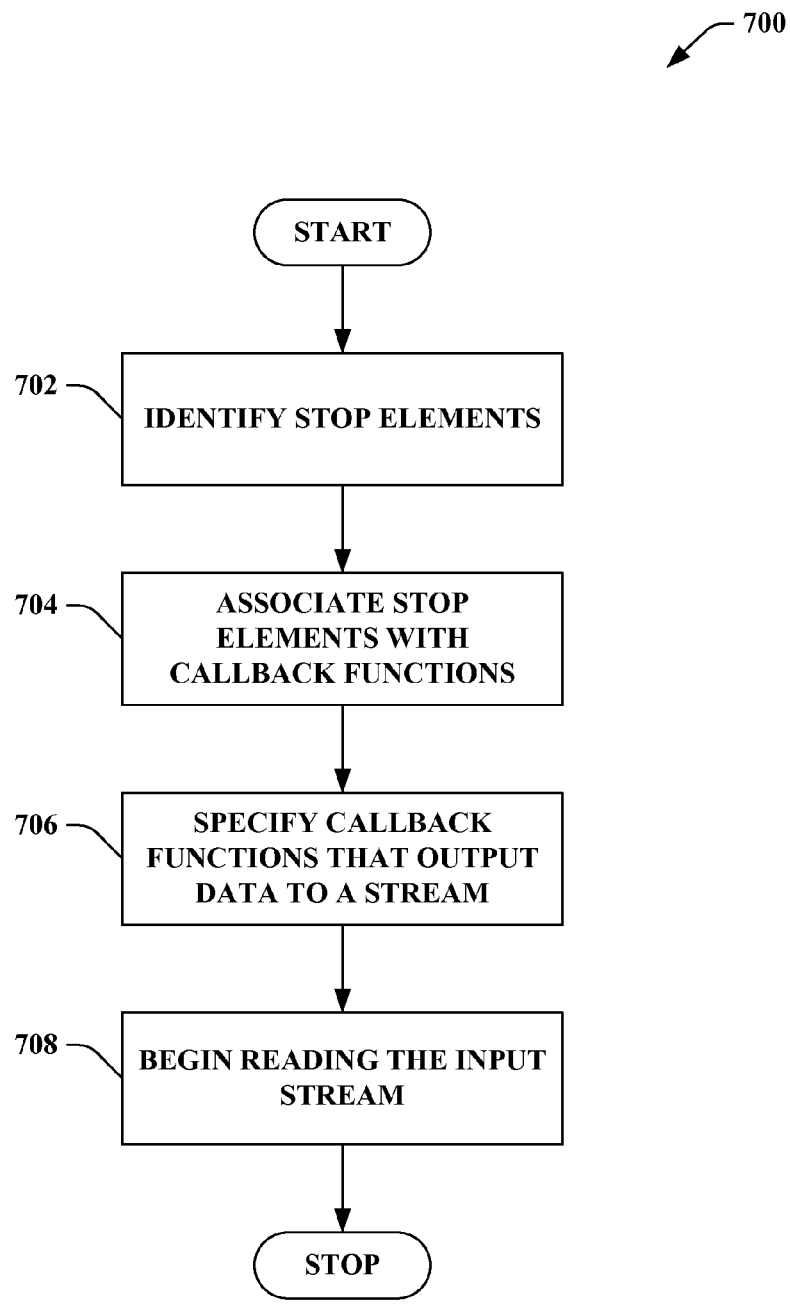
FIG. 7 illustrates an exemplary flow chart for configuring a stream transformation architecture.
Figure 8:
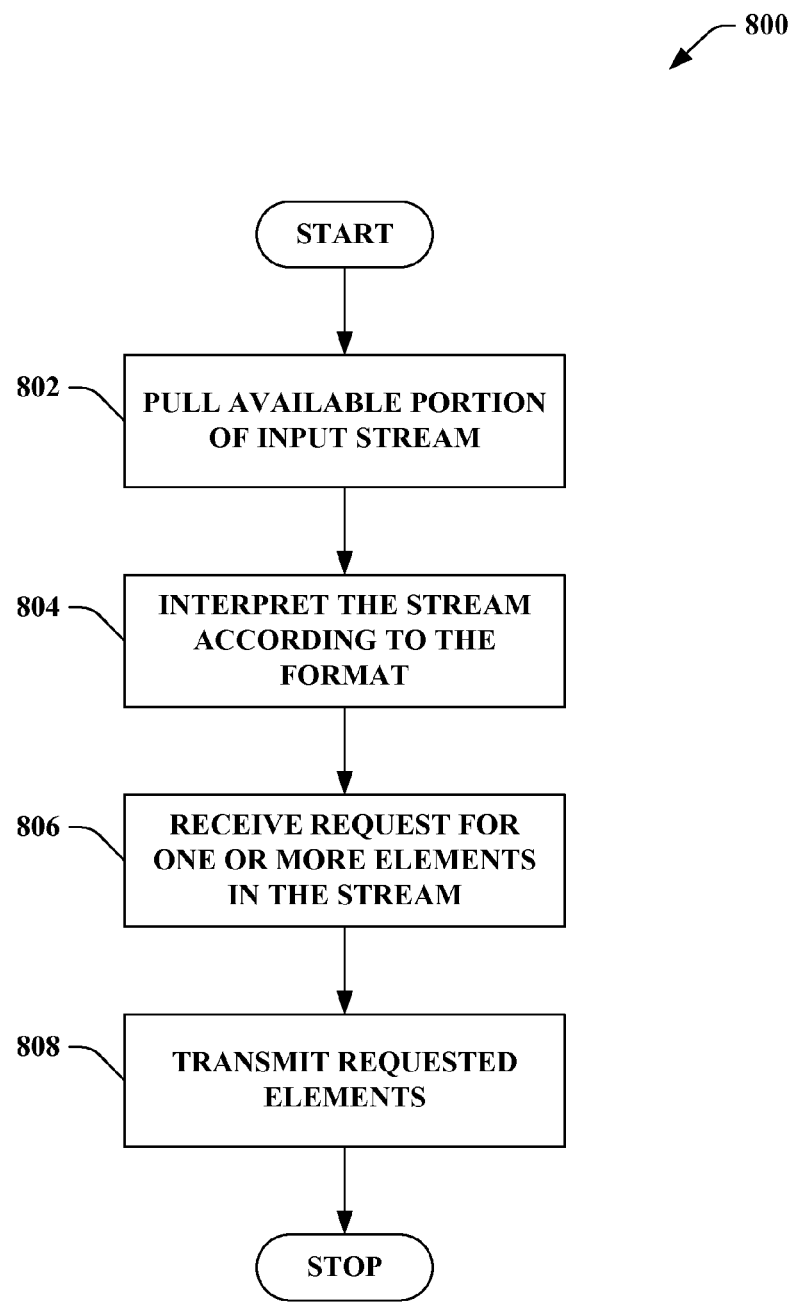
FIG. 8 illustrates an exemplary flow chart for pulling the stream and responding to requests for elements in the stream.

In view of the exemplary systems described supra, methodologies that may be implemented in accordance with the disclosed subject matter will be better appreciated with reference to the flow charts of FIGS. 6-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 6 illustrates a methodology 600 for transforming a data stream from one format and storing it in another format (or the same format in a different location, for example). As described, this can have many embodiments and utilities such as to transfer a stream to a persistent storage that can be managed outside of the stream processing. This allows access to virtually limitless portions of a stream (e.g. as much as the persistent storage can hold) while not utilizing the main memory of a stream device or a consumption device for example. Another aim, in this regard, is to maintain structure, or be able to restructure the data according to the original structure, upon storage. Thus, in one embodiment, the data can be hierarchical and/or nested data stored in a persistent storage, such as a relational database (local and/or distributed) to facilitate efficient querying. In this regard, as described above, structure can be kept (or stored) using a series of keys to associated the hierarchical data in its stored relational form.

At 602, the data stream is pulled in a first format. As described, this can be the result of a pull request from another entity (such as for a portion, element, or entirety of the stream). The data stream can be substantially any stream in substantially any format. As described, the stream can be for many purposes comprising many different data contents or mixtures thereof. The data can be pulled as it comes in via a notification event, for example, or request/response behavior. At 604, the pulled data stream is read until a point of interest is consumed. If no such point exists, the data can be continually pulled and read until such point is reached. The point of interest can relate to an element or attribute of the data string, for example, and can act as a trigger to perform some function on the stream. For instance, the consumption of a point of interest can cause a portion of the stream to be transformed into a different structure at 606.

Such transformation can keep a structure of the first format upon transformation, such as a relational or hierarchical structure (whatever structure the first format can have). This can be done in a number of ways depending on the original and stored structures of the data. In one embodiment, the data can be XML formatted data, for example, having a plurality of start and end tags indicating elements, where the elements can be nested to form a hierarchical structure. This structure can represent a relationship between the elements, for example. In this embodiment, the stream can be transformed to a different structure (or the same structure on a different storage medium, for example). Storing the XML in a relational database, however, can retain structure using keys (such as primary and foreign keys) to relate the data to one another such that subsequent retrieval can form the data in substantially the same format as received in the original stream (preserving order and hierarchy, for example). Additionally, the converse storage of relational data to XML, for example, can utilize hierarchical structure to preserve key usage. It is to be appreciated that there are many other examples and methods for different formats; for example, taking an XML stream to a flat text file, other fields or indicators (unique identifiers) can be used to relate data to its hierarchical structure. At 608, the data is output in the second format. As mentioned, this can be to utilize a persistent storage, for example, so long as the stream is consumed and output to a different format and/or location. The output can also utilize one or more streams into one or more sources for redundant, multiple, and/or alternative storage schemes.

FIG. 7 shows a methodology 700 for setting up a data stream transformation architecture. This can be implemented by substantially any program application and/or device (such as a hardware device, etc.). Once up and running, the transformation architecture can operate according to one or more of the embodiments described herein. At 702, stop elements in the data stream are identified. The stop elements can relate to portions of the stream, which when encountered cause an event to occur (with respect to the stream, for example). The stop elements allow for the stream to be parsed while pulling out only certain items for further processing if desired. To this end, the entire stream need not be stored, in some cases (unless desired, for example), rather the data that is to be subsequently used can be pulled out. At 704, the stop elements are associated with callback functions that perform the foregoing behavior. The callback functions can be executed when the stop elements are hit and a specific element can have a specific callback. For example, in an XML to relational database embodiment, the callback function can stop at certain XML elements and formulate a query string to insert a portion of data related to the stop elements into a database, for example.

At 706, the callback functions are defined/specified to output data to the stream. For example, the function can be implemented such that it is accessible upon reaching a stop element. The function can be coded to perform a variety of output tasks related to the stream data, for example. In one embodiment, the callback function can open an output stream and write data to it according to a transformation scheme. Thus, in a file to database implementation, the database connection can be opened (unless globally opened already), the query string for insertion can be formulated, and executed with the input stream data. Other tasks can be performed by the function as well; for example if deletion of rows or creation of a new table is desired, for example. At 708, reading can begin on the input stream and the architecture can be utilized to perform the described functionality.

FIG. 8 shows a methodology 800 for responding to a read request to transform a stream to a disparate format. As described, the stream can be pulled from a device exposing the stream and then transmitted in portions of elements to facilitate efficient storage thereof while maintaining hierarchy and order. At 802, an available portion of the input stream is pulled (e.g. from an exposing device). As described, this can be request/response and/or notification via subscription to effectuate the read. The available portion of the stream can be input into a temporary buffer, for example, and at 804, the stream can be interpreted in its native format. Thus, the stream can be read to determine one or more elements according to the format; in one example, the stream can be XML and can be interpreted as a series of tags, elements, and attributes, and temporarily stored in memory to facilitate programmatic access thereof.

At 806, a request is received for one or more elements in the stream. The elements can be determined according to the interpreted stream; in this regard, the stream can be requested one element at a time after the available portion is pulled. Additionally, the available portion can be pulled as a result of the request for the one or more elements. At 808, the requested elements are transmitted to the requestor. In one embodiment, the requestor can output the requested elements to an output stream as further described herein, for example.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
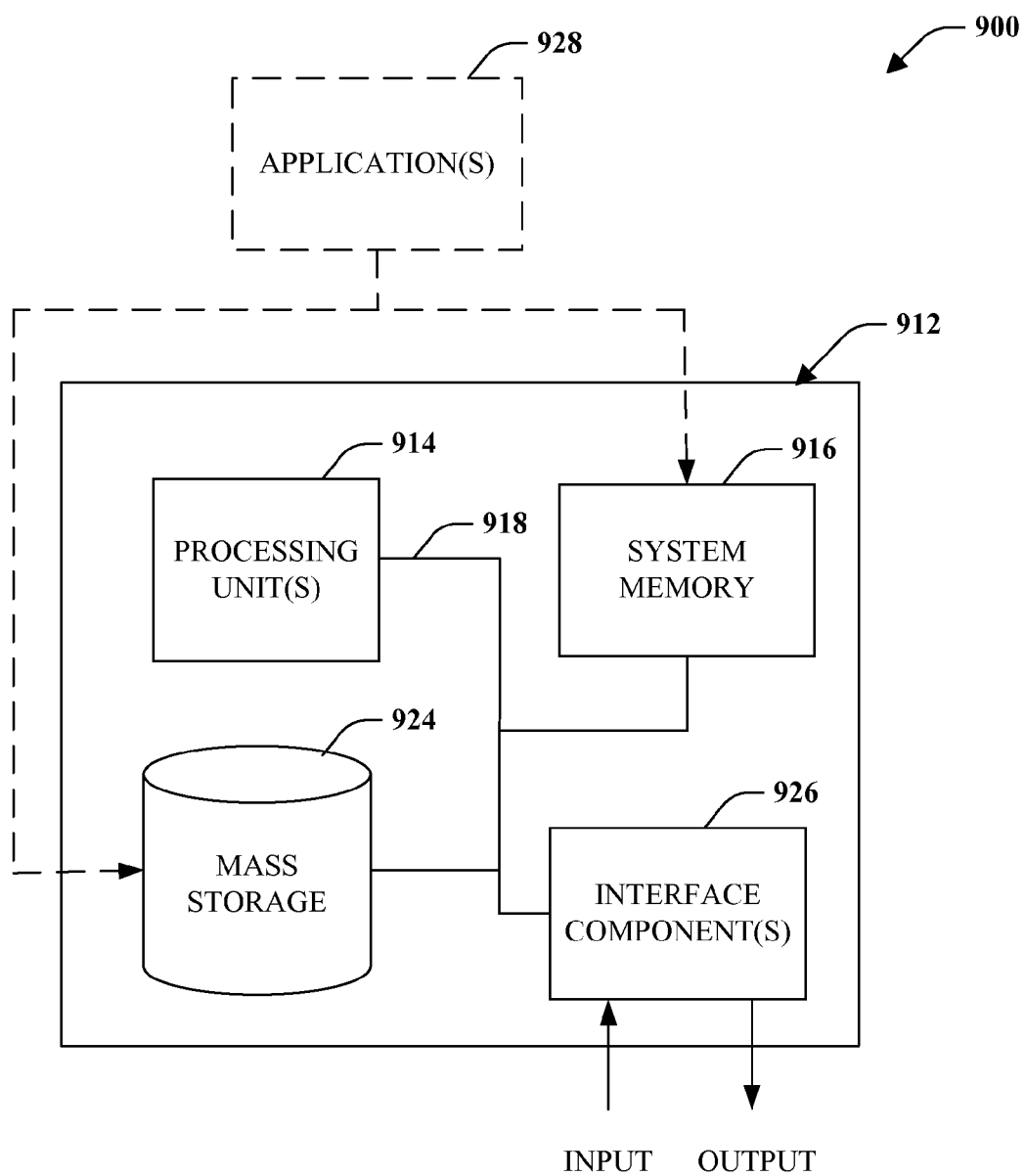
FIG. 9 is a schematic block diagram illustrating a suitable operating environment.
Figure 10:
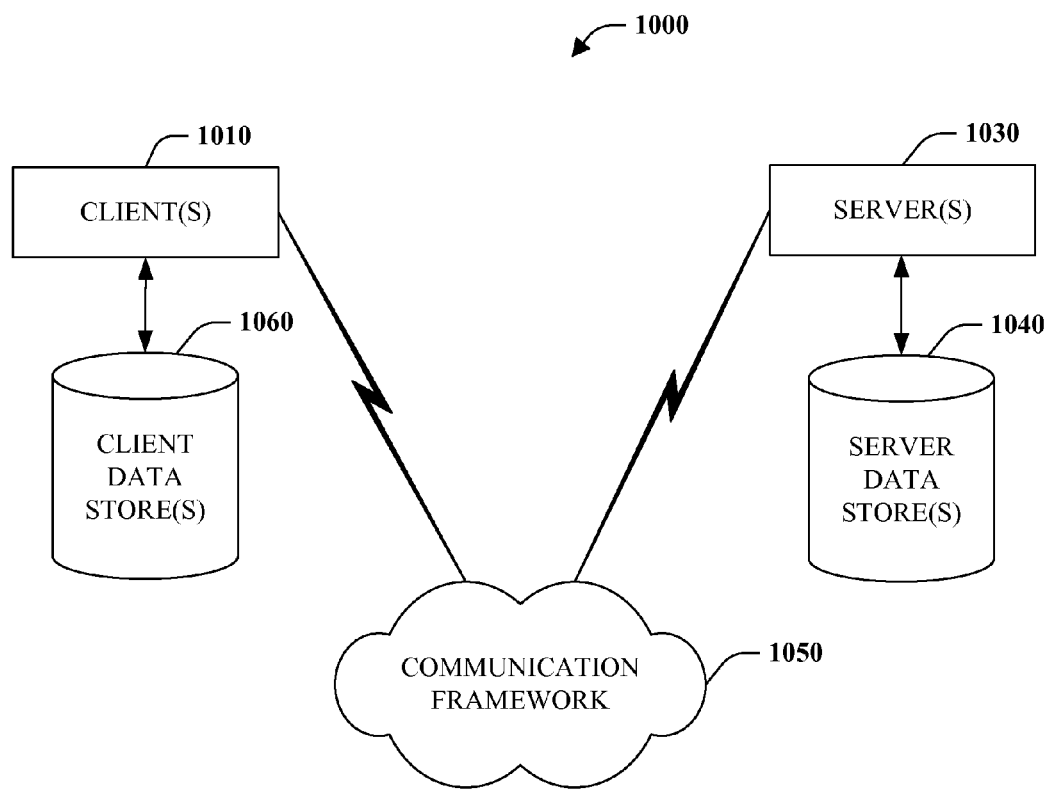
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 9, an exemplary environment 900 for implementing various aspects disclosed herein includes a computer 912 (e.g., desktop, laptop, server, hand held, programmable consumer or industrial electronics . . . ). The computer 912 includes a processing unit 914, a system memory 916 and a system bus 918. The system bus 918 couples system components including, but not limited to, the system memory 916 to the processing unit 914. The processing unit 914 can be any of various available microprocessors. It is to be appreciated that dual microprocessors, multi-core and other multiprocessor architectures can be employed as the processing unit 914.

The system memory 916 includes volatile and nonvolatile memory. The basic input/output system (BIOS), containing the basic routines to transfer information between elements within the computer 912, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 912 also includes removable/non-removable, volatile/non-volatile computer storage media. FIG. 9 illustrates, for example, mass storage 924. Mass storage 924 includes, but is not limited to, devices like a magnetic or optical disk drive, floppy disk drive, flash memory or memory stick. In addition, mass storage 924 can include storage media separately or in combination with other storage media.

FIG. 9 provides software application(s) 928 that act as an intermediary between users and/or other computers and the basic computer resources described in suitable operating environment 900. Such software application(s) 928 include one or both of system and application software. System software can include an operating system, which can be stored on mass storage 924, that acts to control and allocate resources of the computer system 912. Application software takes advantage of the management of resources by system software through program modules and data stored on either or both of system memory 916 and mass storage 924.

The computer 912 also includes one or more interface components 926 that are communicatively coupled to the bus 918 and facilitate interaction with the computer 912. By way of example, the interface component 926 can be a port (e.g., serial, parallel, PCMCIA, USB, FireWire . . . ) or an interface card (e.g., sound, video, network . . . ) or the like. The interface component 926 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 912 to output device(s) via interface component 926. Output devices can include displays (e.g., CRT, LCD, plasma . . . ), speakers, printers and other computers, among other things.

FIG. 10 is a schematic block diagram of a sample-computing environment 1000 with which the subject innovation can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the aspects of the subject innovation, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. Here, the client(s) 1010 can correspond to program application components and the server(s) 1030 can provide the functionality of the interface and optionally the storage system, as previously described. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

By way of example, client(s) 1010 can read, transform, and output one or more data streams to a persistent centralized storage. The client(s) 1010 can temporarily consume a data stream and transform it into a more persistent format while preserving order and hierarchy present in the stream. The client(s) 1010 can output the transformed stream across the communication framework 1050 to one or more server(s) 1030 and/or the data store(s) 1040 associated therewith. Additionally, one or more client(s) 1010 can request access to the data stored in data store(s) 1040 across communication framework 1050. The requested data can be retrieved from the data store(s) 1040 by one or more server(s) 1030 and transformed back into the format of the original data stream. Subsequently, the restructured data can be sent back to the client(s) 1010 from the server(s) 1030 in substantially the same format as it was in the original data stream.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A system, comprising at least one processor coupled to at least one computer-readable medium storing instructions executable by the at least one processor to implement:
    a composite stream transformation component configured to:
        receive, at an allocated region of memory, a portion of data, the portion of data being received as a portion of a hierarchically formatted stream, the composite stream component being further configured to pull the portion of data from a component exposing the portion of data and interpret the portion of data one element at a time until consuming a stop element;
        transform, based on identifying a point of interest in the hierarchically formatted stream, the portion of data into a flat structure within the allocated region of memory while maintaining hierarchical indicia, the composite stream component being further configured to execute a callback function based on the stop element, the callback function configured to transform the portion of data into the flat structure and output the portion of data as transformed to a data stream store;
        off-load the portion of data from the allocated region of memory;
        re-load the portion of data into the memory in the flat structure; and
        recreate the portion of the hierarchically formatted stream from the portion of data in the flat structure using the hierarchical indicia.

2. The system of claim 1, wherein off-loading the portion of data includes freeing a first specific portion of the allocated memory region holding the portion of data as transformed.

3. The system of claim 1, wherein off-loading the portion of data includes freeing a first specific portion of the allocated memory region holding the portion of data as originally received.

4. The system of claim 1, wherein the hierarchically formatted stream is encoded in an extensible markup language (XML) format.

5. The system of claim 1, further comprising a data access component that responds to one or more requests for the portion of data.

6. The system of claim 1, wherein the flat structure is caused to be stored as at least part of a relational database.

7. A method, comprising:
receiving, at a memory, a portion of data, the portion of data being received as a portion of a hierarchically formatted stream;
associating a stop element related to the hierarchically formatted stream with a function for performing an activity on the hierarchically formatted stream;
relating the stop element to an identifier in the hierarchically formatted stream that triggers the function when the stop element is consumed;
transforming, based on identifying a point of interest in the hierarchically formatted stream, the portion of data into a flat structure while maintaining hierarchical indicia;
off-loading the portion of data from the memory;
re-loading the portion of data into the memory in the flat structure; and
recreating the portion of the hierarchically formatted stream from the portion of data in the flat structure using the hierarchical indicia.

8. The method of claim 7, further comprising:
reading the hierarchically formatted data stream;
discarding or ignoring extraneous data in the hierarchically formatted data stream;
beginning the transforming at a the point of interest in the hierarchically formatted data stream; and
stopping the transforming based on reaching an identifier in the hierarchically formatted data stream.

9. The method of claim 8, further comprising:
based on an appearance of a second point of interest in the hierarchically formatted stream, transforming a second stream disparate from the hierarchically formatted stream until reaching an ending indicator corresponding to the second point of interest;
writing information to identify the second point of interest as related to the hierarchically formatted stream; and
subsequently stopping the transforming of the portion of the hierarchically formatted stream based on reaching the identifier in the hierarchically formatted stream.

10. The method of claim 7, further comprising, by the function, defining procedures for the transforming the portion of data and causing a transformed portion of the stream to be stored.

11. The method of claim 7, wherein off-loading the portion of data from memory includes freeing the memory.

12. The method of claim 7, wherein off-loading the portion of data includes causing the portion of data, as transformed, to be stored in a persistent data store.

13. The method of claim 7, wherein the hierarchically formatted stream is encoded in an extensible markup language (XML) format and the flat structure is part of a relational database structure.

14. A computer-readable storage medium storing instructions, the instructions if executed by a computing device causing the computing device to perform operations comprising:
receiving, at a memory, a portion of data, the portion of data being received as a portion of a hierarchically formatted stream;
associating a stop element related to the hierarchically formatted stream with a function for performing an activity on the hierarchically formatted stream;
relating the stop element to an identifier in the hierarchically formatted stream that triggers the function when the stop element is consumed;
transforming, based on identifying a point of interest in the hierarchically formatted stream, the portion of data into a flat structure while maintaining hierarchical indicia;
off-loading the portion of data from the memory;
re-loading the portion of data into the memory in the flat structure; and
recreating the portion of the hierarchically formatted stream from the portion of data in the flat structure using the hierarchical indicia.

15. The computer-readable storage medium of claim 14, wherein off-loading the portion of data from memory includes freeing the memory.

* * * * *